United States Patent
Duch et al.

(10) Patent No.: US 9,247,586 B2
(45) Date of Patent: Jan. 26, 2016

(54) UNIT FOR CONDUCTIVELY HEATABLE MELTING

(75) Inventors: Klaus-Dieter Duch, Taunusstein (DE); Johann Weber, Wiesbaden (DE); Franz Ott, Mitterteich (DE); Robert Rühl, Mainz (DE)

(73) Assignee: Schott AG, Mainz (DE)

( * ) Notice: Subject to any disclaimer, the term of this patent is extended or adjusted under 35 U.S.C. 154(b) by 2258 days.

(21) Appl. No.: 10/574,748

(22) PCT Filed: Oct. 6, 2004

(86) PCT No.: PCT/EP2004/011153
§ 371 (c)(1),
(2), (4) Date: Dec. 26, 2006

(87) PCT Pub. No.: WO2005/036929
PCT Pub. Date: Apr. 21, 2005

(65) Prior Publication Data
US 2007/0098036 A1 May 3, 2007

(30) Foreign Application Priority Data
Oct. 6, 2003 (DE) .................................. 103 46 337

(51) Int. Cl.
*C03B 5/027* (2006.01)
*H05B 3/60* (2006.01)
(Continued)

(52) U.S. Cl.
CPC *H05B 3/03* (2013.01); *C03B 5/027* (2013.01); *C03B 5/167* (2013.01); *C03B 5/425* (2013.01)

(58) Field of Classification Search
CPC ........ C03B 5/027; C03B 5/425; C03B 5/167; C03B 5/1672; C03B 5/43; H05B 7/12; F27D 11/10; F27D 11/04; F27D 11/02; F27D 9/00; F27B 3/10; F27B 3/08

USPC ........... 393/27, 30, 38, 36, 37, 41, 35, 69, 94, 393/52, 54, 55; 373/93, 95, 96, 33, 79, 38, 373/82, 88, 90; 65/DIG. 6
See application file for complete search history.

(56) References Cited

U.S. PATENT DOCUMENTS 2,749,379 A * 6/1956 Geffcken et al. ................ 373/39
2,798,892 A * 7/1957 Penberthy ....................... 373/38
(Continued)

FOREIGN PATENT DOCUMENTS

DE 209173 4/1984
DE 279057 5/1990
(Continued)

OTHER PUBLICATIONS

Office Action from corresponding Chinese Patent Application No. 200480029303.0 dated Aug. 22, 2008. (Translation).
(Continued)

*Primary Examiner* — Hung D Nguyen
(74) *Attorney, Agent, or Firm* — Ohlandt, Greeley, Ruggiero & Perle, LLP (57) ABSTRACT

A melting and/or refining unit for conductively heatable melts, in particular glass melts, is provided. The melting and/or refining unit has a tank and at least one electrode. The electrode passes through an opening in a wall of the tank so as to be immersed in the conductively heatable melt. The melting and/or refining unit has an apparatus for reducing the local introduction of heating power into at least one region adjacent to the electrode.

31 Claims, 7 Drawing Sheets

(51) Int. Cl.
*H05B 7/10* (2006.01)
*H05B 7/12* (2006.01)
*H05B 3/03* (2006.01)
*C03B 5/167* (2006.01)
*C03B 5/425* (2006.01)

(56) References Cited

U.S. PATENT DOCUMENTS

| | | | | |
|---|---|---|---|---|
| 3,015,190 A | * | 1/1962 | Arbeit | 65/134.4 |
| 3,384,697 A | * | 5/1968 | Fouse | 373/38 |
| 3,409,725 A | | 11/1968 | Penberthy | 13/6 |
| 4,159,392 A | * | 6/1979 | Fineo et al. | 373/38 |
| 4,287,380 A | * | 9/1981 | Fairbanks et al. | 373/36 |
| 4,319,068 A | * | 3/1982 | Williamson | 373/37 |
| 4,468,779 A | * | 8/1984 | Gillman | 373/36 |
| 4,819,247 A | | 4/1989 | Seng et al. | 373/30 |
| 5,151,918 A | | 9/1992 | Argent et al. | 373/27 |
| 6,235,075 B1 | * | 5/2001 | Hofmann et al. | 75/10.5 |

FOREIGN PATENT DOCUMENTS

| | | | |
|---|---|---|---|
| DE | 10223606 | | 12/2003 |
| DE | 10132729 | | 5/2004 |
| GB | 2057828 A | * | 4/1981 |
| JP | 56092127 | | 7/1981 ............. C03B 5/027 |

OTHER PUBLICATIONS

Office Action from corresponding German Patent Application No. 10346337.2-34 dated Feb. 18, 2010.

* cited by examiner

UNIT FOR CONDUCTIVELY HEATABLE MELTING

CROSS-REFERENCE TO RELATED APPLICATIONS

This application claims the benefit under 35 U.S.C. §365 of International Application Serial No. PCT/EP/2004/011153 filed Oct. 6, 2004, which claims the benefit of German Application No. 103 46 337.2 filed on Oct. 4, 2003.

BACKGROUND OF THE INVENTION

1. Field of the Invention

The invention relates in general terms to a unit, in particular a melting and/or refining unit and/or a distributor system and/or a channel system, for conductively heatable melts, and specifically to a unit for conductively heatable glass melts.

2. Description of Related Art

The production of glasses involves the formation of glass melts to which thermal energy is supplied. This applies to the process of melting down glass or glass charge cullet, as well as subsequent process steps, such as for example refining or homogenization. The thermal energy which this requires can particularly efficiently be released directly in the melt by means of the Joule effect.

Therefore, melting installations, in particular for glass-making, often use electrodes which are immersed in the liquid melt. Electric current is introduced into the melt via the electrodes. The electrode unit in this case comprises the electrode body and an electrode holder which carries the electrode body. The electrode holder and the electrode body are generally fixedly connected to one another, for example by screw connection or welding. For its part, the electrode holder is fixedly connected to the external surroundings.

Electrodes are used immersed in the melt both in the base and in the sides or from above. The form of electrode which is most frequently used is the stick shape, since this is very easy to push in further. Moreover, the stick-shaped electrode offers the advantage that it is possible to exchange the entire arrangement made of electrode holder and electrode body even when the installation is running. In the case of plate electrodes, by contrast, it is not possible to either exchange the electrode or push it in further during operation.

Above a certain temperature, glasses become electrically conductive, so that at voltages up to approximately 1000 V, sufficiently high currents can usually flow to heat the glass melt using the Joule effect. In the melt, the current is substantially transported by the ions of different mobility. Standard frequencies for the conductive heating of melts are 50 or 60 Hz; frequencies of 10 kHz are used for high-quality glasses, in particular optical glasses.

Figure 1:
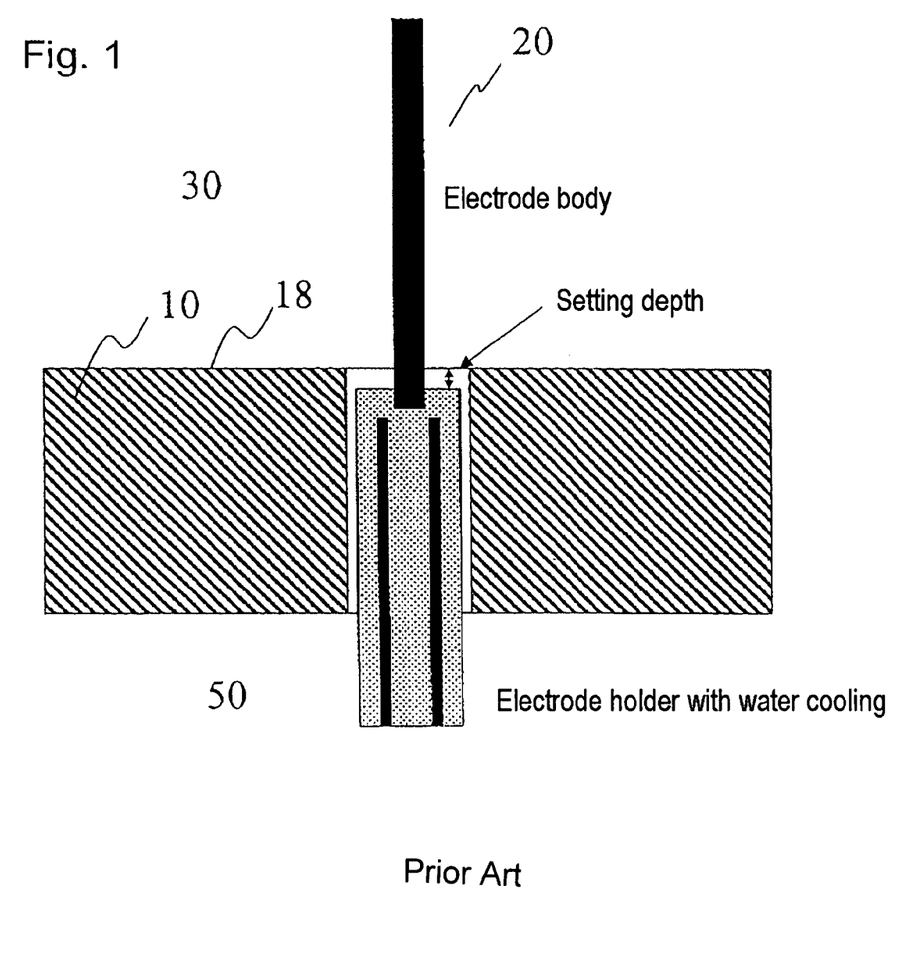
FIG. 1 diagrammatically depicts an excerpt from a wall of a melting and/or refining unit having an electrode.

FIG. 1 illustrates a typical structure which illustrates how the current is fed into the melt from outside the unit via an electrode. The figure shows an excerpt from the wall of a melting and/or refining unit having an electrode assembly. The arrangement comprises a generally water-cooled electrode holder, in which the actual electrode body is secured in a suitable way. On the outside, the electrode holder is connected to a heating circuit transformer via a cable. The electrode is introduced into the melt through the wall, which is constructed from refractory material. The distance, in the longitudinal direction of the electrode holder or electrode body, from the upper side of the electrode holder, facing the melt, to that surface of the wall which faces the melt is referred to as the setting depth. The setting depth is determined according to the particular type of glass, in particular its vitrification and crystallization properties, as well as the required process temperatures and the structure of the wall, in particular the thermal conductivity of the materials used.

It is customary to use separate electrode bricks in which there is a drilled hole for the electrode. The electrode brick itself is inserted into the wall of the melting and/or refining unit. A separate electrode brick offers the advantage that the region around the electrode can be easily observed from the outside. It is in this way possible to quickly recognize cracks and glass leakages. If the thickness of the brick is reduced by the glass melt on account of corrosion, it is easy to apply forced cooling from the outside, which efficiently cools that side of the electrode brick which faces the glass and therefore reduces the corrosion caused by the glass melt.

Details can be found in the relevant specialist literature on glass technology. The prior art is well documented, for example, in the HVG training volumes "Elektroschmelzen von Glas" [Electrical melting of glass] 1990 and "Wärmetransportprozesse bei der Herstellung und Formgebung von Glas" [Heat transfer processes in the production and shaping of glass] 2002.

The current, which is fed in from the outside from suitable matching transformers via feed lines, enters the glass melt from the electrode body in order to heat the glass melt by the Joule effect. The electrical power density $\rho_{el}(\vec{r})$ for the entire arrangement comprising melt and wall, given the standard dimensions of the units and heating frequencies, can be calculated as:

$$P_{el}(\vec{r}) = \vec{J}(\vec{r}) \cdot \vec{E}(\vec{r}) = \rho_{el}(T) \cdot \vec{J}^2(\vec{r}) = \sigma_{el}(T) \cdot \vec{E}^2(\vec{r}) \quad (1)$$

where $P_{el}(\vec{r})$ has the dimension $$\left[\frac{W}{m^3}\right].$$

$\vec{E}$ is the electric field in $$\left[\frac{V}{m}\right] \text{ and } \vec{J}$$

is the current density in $$\left[\frac{A}{m^2}\right]$$

at any location $\vec{r}$ of the arrangement observed. $\rho_{el}$ denotes the electrical resistivity in [Ω·m] and $\sigma_{el}$ denotes the electrical conductivity of the materials used in $$\left[\frac{S}{m}\right].$$

The electrical resistivity and the electrical conductivity are temperature-dependent. In the case of the glasses and refractory materials that are customarily used, they are generally negatively temperature-dependent. This means that with increasing temperature, the electrical conductivity increases or the electrical resistivity decreases.

The electrical power density $\rho_{el}$ introduced into the entire arrangement according to equation 1 first of all leads to an increase in temperature ΔT at any point $\vec{r}$. In glass melts, the heat quantity $\dot{q}_{Pel}$ generated on account of the current in a local volume element can be dissipated again from the volume element under consideration with the aid of three mechanisms.

The first mechanism is heat conduction, which is imparted by phonons. It is assigned a $\dot{q}_{heat\ conduction}$. The second mechanism for dissipating heat from a specific volume element of the melt is radiation (heat flow $\dot{q}_{radiation}$), the exchange particles of which are photons. Finally, heat can also be dissipated from the melt by means of convection flows by a heat flow $\dot{q}_{convection}$. All three mechanisms are temperature-dependent. In general, apart from exceptions in the case of what are known as "dark" glasses, radiation is the dominant process.

After the start-up phase, a steady state is established at a defined temperature $T_{eq}$, in which the heat flows involved are in equilibrium with one another. In the steady state at $T=T_{eq}$, the following relationship applies:

$$\dot{q}_{Pel} = \dot{q}_{radiation} + \dot{q}_{convection} = \dot{q}_{heat\ conduction} \qquad (2)$$

After the heat quantity generated by the electric current has been dissipated from a volume element of the melt, a volume element of the material of the wall of the unit will now be considered. The refractory materials which are in contact with glass melts can be roughly divided into three groups. What are known as the HZFC (high zirconia fused cast) materials, which are cast at temperatures around 2300° C., become soft beyond 1900° C. to 2000° C. AZS (alumina zirconia silica) materials, the casting temperatures of which are 1900° C. to 2000° C., do not become soft, but rather decompose at a temperature above approximately 1800° C. ZS (zirconium silicate) materials, which are sintered in pressed form during production, decompose above temperatures of just 1700° C. In any event, high excess temperatures in the refractory material lead to destruction of the latter.

At high temperatures, many refractory materials have an electrical conductivity comparable to that of glasses. In the refractory material itself, the heat quantity which is locally released by the electric current, contrary to the situation for the melt as described above, however, can substantially only be dissipated by the mechanism of pure heat conduction.

If, in the volume element under consideration, the dissipation of heat from the refractory material is lower than the heat quantity $\dot{q}_{Pel}$ generated in this volume element, the temperature will rise. In the volume element under consideration, this is associated with an increased electrical conductivity on account of the negative temperature dependency of the electrical resistivity. At constant voltage and therefore with a constant electric field E, a rise in the electrical conductivity $\sigma_{el}(T)$ in accordance with equation 1 is associated with a higher electric power density $P_{el}(\vec{r})$. Accordingly, the temperature rises further. This process repeats itself until, at a relatively high temperature, a new equilibrium state is reached in the refractory material of the wall of the unit.

In a situation which can still be tolerated, all that happens is that the usual corrosion of the refractory material is accelerated on account of the higher temperature. The service life of the unit is shortened as a result. In the least favorable situation, however, the system goes out of control, leading to destruction of regions of the refractory material caused by partial melting or rapid decomposition.

In the case of refractory materials, it is not just the electrical resistivity in the new state which needs to be taken into consideration, but also the possibility that this resistivity may change during operation, for example as a result of the introduction of glass constituents, in particular caused by alkali metal diffusion. The material becomes more electrically conductive as a result, thereby increasing the risk of local instabilities in the refractory material.

If the temperatures in the wall of the unit are higher than in the melt, the melt itself functions as a cooling medium for the wall of the unit. The dissipation of heat from the wall can be improved by adapting the insulation on the outer side. The same applies to externally applied forced cooling with air.

In addition to the advantage of improving the dissipation of heat from the wall, however, the abovementioned measures also bring with them serious drawbacks. Although the risk of excess temperatures is reduced, the cooling or reduced insulation means unnecessary additional heat loss. As a result, the efficiency of the overall installation is adversely affected to a considerable extent. On account of the altered temperatures and heat flows, furthermore, flow phenomena may occur in the glass melt, having an adverse effect on the quality of the process.

The problem mentioned above is caused in particular by the material forming the electrode brick. This material needs to be able to withstand temperature changes, since water-cooled electrode holders are generally used. In the case of electrodes which can be pushed in further, the water supply to the electrode holder is interrupted a number of times during a tank campaign, with the result that the electrode brick is exposed to very considerable temperature gradients within a short period of time.

During the heating of the installation and/or on account of the abovementioned high temperature gradients, cracks may form in the electrode brick. These cracks generally extend radially outward from the electrode bore in the brick. Glass can penetrate into cracks of this type, thereby accelerating the corrosion of the electrode brick.

Therefore, a brick material which is as insensitive as possible to temperature changes should be selected. However, other properties of the brick, such as its resistance to corrosion from the glass melt and the electrical resistivity, should also be taken into consideration.

The ideal refractory material for an electrode brick should satisfy the following criteria. It should have only a low susceptibility to corrosion on contact with the melts used and also a high resistance to temperature changes. Moreover, the electrical resistivity in the technologically relevant temperature range should be significantly higher than that of the corresponding melt. Moreover, the material should ideally have a high thermal conductivity, in order to allow even small quantities of electrical energy released to be efficiently dissipated in the refractory material.

Many refractory materials, which have a high electrical resistivity compared to glass melts, however, have a poor ability to withstand temperature changes, as for example in the case of the zirconium silicate material ZS 1300. The higher the temperature gradient and its spatial profile in the refractory material, the more critical this problem becomes. If refractory materials with a high electrical resistivity compared to the melt are ruled out on account of their poor resistance to corrosion from glass melts, it is necessary to employ materials which are more resistant to the glass melts but under certain circumstances have a higher electrical conductivity.

On account of the required resistance to corrosion from the melt, the ability to withstand temperature changes, the availability and price, there is a very limited choice of suitable refractory materials.

To avoid the risk of excess temperatures, therefore, adapting the electrical heating by suitably selecting the heating circuit geometries, the phase positions and the electrode positions in the melting and/or refining unit has been the only viable solution known hitherto. By way of example, the study entitled "Elektrotechnische und wärmetechnische Untersuchungen zur Auswahl von Feuerfestmaterialien für Elektroschmelzöfen zur Glasschmelze" [Electrical engineering and heat engineering tests on the selection of refractory materials for electric melting furnaces for glass melts] by H.-J. Illig et al., XI International Glass Congress, Prague 1977, anthology V, recommends that a maximum electric field strength of 4-5 V/cm should not be exceeded using typical materials for the tank. However, this imposes considerable restrictions on the way in which the installation is operated.

One possible option is, for example, a switch from bottom electrodes to what are known as top electrodes, which are immersed in the melt from above and do not have to be passed through a refractory structure.

In many cases, it would be desirable for the electrical heating circuits to be operated with a higher power and therefore higher voltages, in order, for example, to achieve higher throughputs or to optimize the flows with regard to glass quality. If all the optimization options, in particular those presented above, have already been exhausted, in many cases the diameters of the electrode sticks are increased, in order to influence the current densities and therefore the local release of energy in the immediate vicinity of the electrode. However, the electrode diameter cannot continue to be increased arbitrarily, since the size of the drilled hole in the refractory material is limited.

The underlying problem in the context outlined above resides in the spatially extremely nonuniform distribution of the introduction of heating power into the wall of the tank, which causes damage to the refractory material.

BRIEF SUMMARY OF THE INVENTION

In view of the above circumstances, therefore, it is an object of the invention to reduce the risk of damage to the refractory material, in particular caused by the formation of cracks and corrosion.

A further object of the invention is to reduce local differences in the spatial distribution of the introduction of heating power into the wall of a unit. The term "unit" is to be understood as meaning all arrangements in which the melt is produced, treated and/or transported. In particular, the term "unit" is to be understood as meaning a melting and/or refining unit and/or a distributor system and/or a channel system.

In this context, the reduction of local differences in the spatial distribution of the electric field in the wall of the unit constitutes a further object of the invention.

Moreover, it is an object of the invention to reduce local differences in the temperature distribution in the wall.

Furthermore, it is an object of the invention to lengthen the service life of the unit and to increase the efficiency of the installation.

Figure 2:
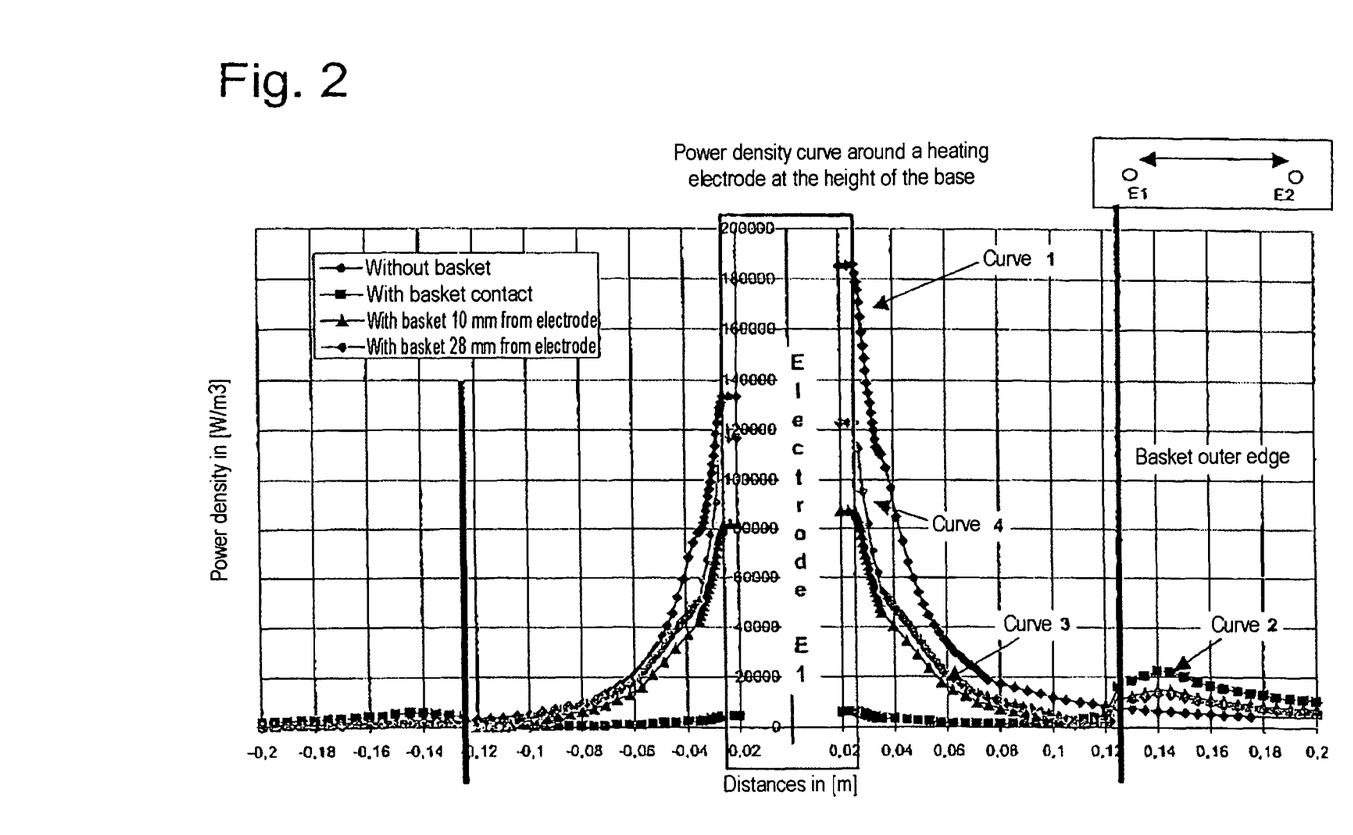
FIG. 2 shows the power density distribution around an electrode at that surface of the wall of the melting and/or refining unit which faces the melt.
Figure 3:
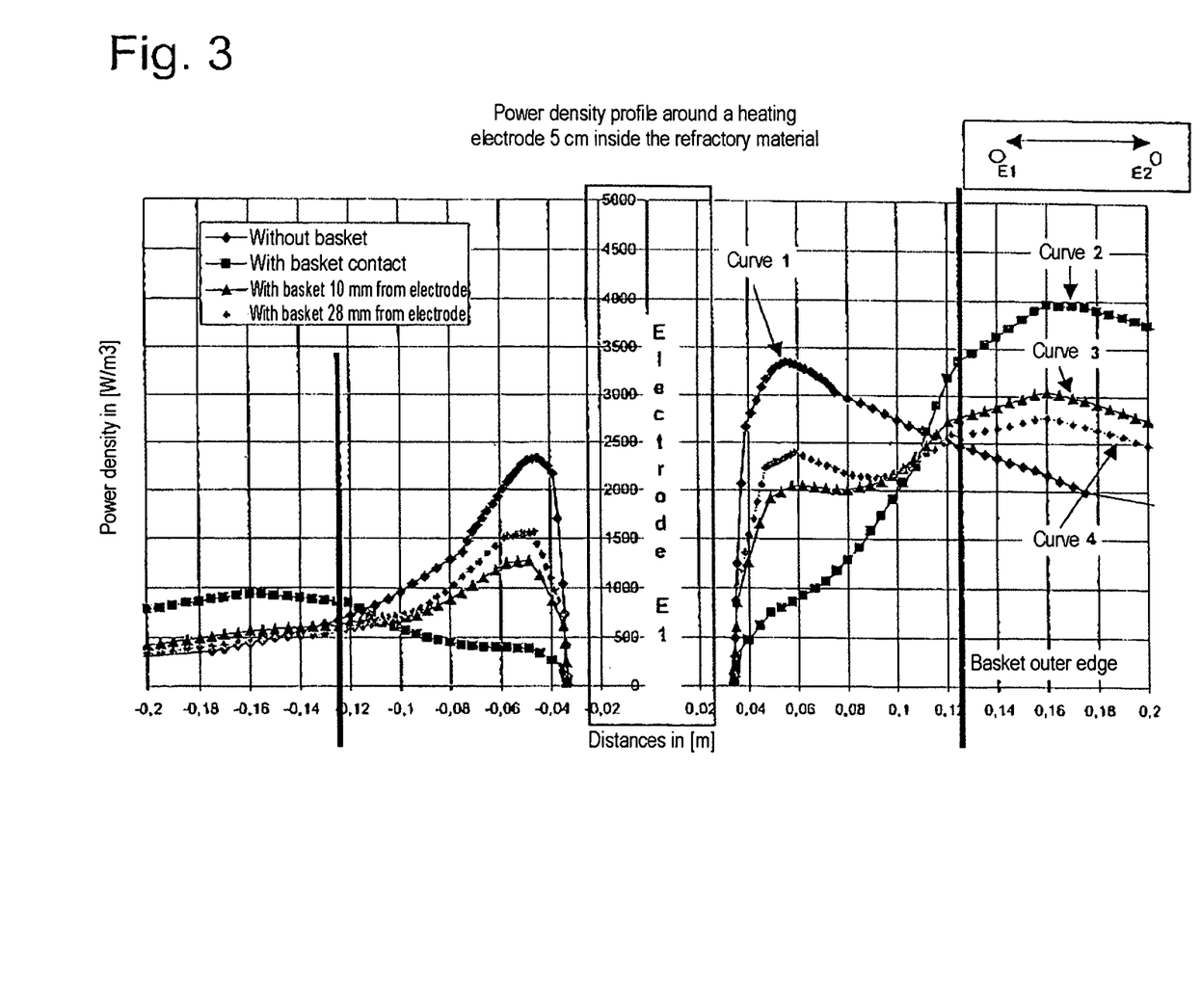
FIG. 3 shows the power density distribution around an electrode at a depth of 5 cm measured from the surface of that side of the wall of the melting and/or refining unit which faces the melt, FIG. 4 diagrammatically depicts a longitudinal section through an electrode brick, FIG. 5 diagrammatically depicts a longitudinal section through a first embodiment of a shielding device according to the invention, FIG. 6A diagrammatically depicts a plan view of a second embodiment of a shielding device according to the invention.

The diagrams presented in FIGS. 2 and 3 show results of a mathematical simulation of the vicinity of the electrode. In this case, $$\rho_{elrefractory} = 2.5 \cdot \rho_{elglass}; (\rho_{elglass} = 20\ \Omega\cdot cm)$$

was predetermined as boundary conditions for the electrical resistivities, since this is a standard ratio in many real melting units. The diagram in FIG. 2 shows the power density at the transition between the wall of the tank and the glass melt; the diagram in FIG. 3 shows the power density at a depth of 5 cm in the refractory material of the wall. Particularly critical regions, in the vicinity of which experience has shown that damage to the refractory material can occur, have therefore been considered.

The highest energy concentrations occur in the immediate vicinity of the electrode, on account of the high electric field gradient. In view of this fact, the invention achieves the abovementioned objects, in a very surprisingly simple way, just by means of a unit as disclosed herein.

The invention provides a unit, in particular a melting and/or refining unit and/or distributor system and/or channel system, for conductively heatable melts, in particular glass melts, which has a tank and at least one electrode, the electrode passing through an opening in a wall of the tank so as to be immersed in the conductively heatable melt, wherein the unit has an apparatus for reducing the local introduction of heating power into at least one region—adjacent to the electrode—of the wall.

The use of the apparatus for reducing the local introduction of heating power in at least one region—adjacent to the electrode—of the wall advantageously reduces the local excess introduction of heating power in this region compared to the remainder of the wall. As a result, moreover, it is possible to produce local differences in the spatial temperature distribution of the wall. Therefore, the causes of damage to the refractory material of the wall can be considerably reduced, if not eliminated altogether, with the aid of the invention.

Advantageous refinements of the invention are to be found in the various embodiments disclosed herein.

To allow the local introduction of heating power to be reduced in a particular simple way, the apparatus according to the invention comprises at least one shielding device.

In the present context, the term "shielding device" is used in very general terms to refer to a device which can be used to reduce excess temperatures caused by a local maximum in the spatial distribution of the power density field.

The shielding device according to the invention may on the one hand be arranged in a region—adjacent to the electrode—of the wall. This advantageously allows flexible adaptation of the materials properties in the critical region of the wall.

To allow the advantageous adaptation of the materials properties in the critical region—adjacent to the electrode—of the wall to be carried out in a particularly simple way, the invention provides that the shielding device comprises an electrode brick made from a first material and at least one insulation device which adjoins the electrode brick.

In this context, the term "insulation device" relates to thermal insulation with respect to the outside.

An arrangement of the shielding device which is advantageously associated with low levels of structural outlay provides for a layered structure thereof, the electrode brick forming one layer and the insulation device forming at least one further layer.

As a result of at least one layer of the insulation device forming a holder for the electrode brick, the invention offers the advantage that cracks in the electrode brick on account of the damage mechanisms explained above do not lead to failure of the system in the apparatus according to the invention. Since the at least one layer of the insulation device in any event reliably holds the electrode brick, there is no longer any risk of failure of an entire wall region.

The electrode brick comprises at least one first refractory material. This material can be optimally adapted to the requirements for the ideal refractory material of an electrode brick. The combination according to the invention with the insulation device leads to the actual electrode brick taking up less space. Therefore, the further advantages of reduced use of this material which, although optimally matched to the requirements, is generally expensive, is combined with a considerable reduction in costs.

The insulation device comprises at least one second refractory material. This at least one second refractory material is advantageously used for thermal insulation and as a result reduces the temperature gradient in the first refractory material of the electrode brick. In this way, the demands imposed on the ability of the first refractory material of the electrode brick to withstand temperature changes are advantageously reduced to a considerable extent. Therefore, the invention counteracts the drawbacks of the refractory materials which have a high electrical resistivity compared to glass melts but a poor ability to withstand temperature changes.

With regard to the service life of the installation, however, it is particularly advantageous if the electrode brick and the insulation device have a high ability to withstand temperature changes. Moreover, preference is given to an embodiment in which the refractory material of the electrode brick and/or the refractory material of the insulation device is resistant to corrosion from the melt.

The invention advantageously offers the option of using a material with a higher electrical conductivity than that of the at least one refractory material of the electrode brick for the refractory material of the insulation device. This option results from the arrangement, according to the invention, of the insulation device in a layered structure with the electrode brick, since the insulation device is therefore positioned further away from the electrode.

The only restriction with regard to the electrical conductivity is formed by the electrical conductivity or the electrical resistivity of the glass melt itself. To ensure disruption-free operation, the invention advantageously provides that the electrical resistivity $\rho_{el,refractory}$ of the at least one refractory material of the insulation device which is in contact with the glass and of the at least one refractory material of the electrode brick is higher than the electrical resistivity $\rho_{el,melt}$ of the melt.

In a particularly preferred embodiment, the electrical resistivity $\rho_{el,refractory}$ of the at least one refractory material of the insulation device which is in contact with the glass, in relation to the electrical resistivity $\rho_{el,melt}$ of the melt, has a value of at least $\rho_{el,refractory}=1.5 \cdot \rho_{el,melt}$, and the electrical resistivity of the at least one refractory material of the electrode brick in particular has a value of $\rho_{el,refractory}=10 \cdot \rho_{el,melt}$.

According to the invention, advantageously for the service life of the materials used, the wall thickness d of the electrode brick is adapted to a selectable upper limit value for the electric field gradient $\Delta E_{1,2}$ at the transition from the electrode brick to the at least one layer of the insulation device. If the upper limit value for the electric field gradient $\Delta E_{1,2}$ at the transition from the electrode brick to the at least one layer of the insulation device is, for example, $\Delta E_{1,2}=5$ V/cm, it is possible to introduce a high heating power. At the same time, the materials used are advantageously substantially undamaged.

To allow the electrode to be reliably pushed in further and/or to achieve stable vitrification of the melt in the gap between the electrode and the refractory material, the invention advantageously provides that the width of the gap between the electrode and the refractory material $b_{Sp}$ has a value in the range from 0 mm $\leq b_{Sp} \leq$ 30 mm.

In a particularly preferred embodiment, the width of the gap between electrode and refractory material $b_{Sp}$ has a value in the range from 2 mm $\leq b_{Sp} \leq$ 5 mm.

As well as being adapted, as described above, to a selectable upper limit value for the electric field gradient $\Delta E_{1,2}$, the wall thickness d of the electrode brick, with a view to achieving a sufficient strength of the electrode brick, is also adapted to the width b of the opening in the electrode brick. According to the invention, the wall thickness d is at least double the width b of the opening in the electrode brick.

In a preferred embodiment, the wall thickness d of the electrode brick is up to 500 mm.

In a particularly preferred embodiment, the wall thickness d of the electrode brick is in the range from 75 mm $\leq b \leq$ 150 mm. Therefore, a sufficient strength and therefore service life of the electrode brick can advantageously be assured combined, at the same time, with the minimum possible use of material and therefore low costs.

In this context, it has proven advantageous for the height h of the electrode brick to be in the range from 20 mm $\leq h \leq$ 300 mm.

The total thickness and load-bearing capacity of the refractory materials of the insulation device should be taken into account when selecting the height h.

In a particularly preferred embodiment, the height h of the electrode brick is in the range from 75 mm $\leq h \leq$ 150 mm.

In addition to the advantage of providing a sufficiently high strength of the electrode brick combined with the minimum possible consumption of material and the corresponding dimensions, the machining costs should also be taken into account with respect to the shape of the electrode brick. In principle, any desired shape and surface quality are possible.

In a preferred embodiment, the electrode brick is rectangular in form and therefore offers the advantage that it can be produced with particularly little outlay and therefore at advantageously low machining costs.

In the solution proposed here, the amount of refractory material used for the electrode brick is only the amount required by the electrical conditions. Therefore, during this selection, it is also possible to use a material which has a greater potential for forming defects in the glass than, for example, the refractory material of the insulation device, which is in contact with the glass. In this context, the overall throughput and therefore the dilution effect play a significant role. There are many installations in operation in which the entire base rather than just the immediate vicinity of the electrodes is made from the refractory material of the electrode brick (as in FIG. 4).

According to the inventors' considerations and experience, there are in particular two preferred ways of introducing the refractory material of the electrode brick into the refractory material of the insulation device.

Firstly, the corresponding contact surfaces can be ground very cleanly, so that substantially no joints occur. Alternatively, defined joints can be filled with a glass or glass powder of poor electrical conductivity which, moreover, has a high viscosity at the desired temperatures of use, so that it cannot be flushed out by the production glass. This glass can also be considered as what is known as an alkali metal diffusion barrier for the brick materials 1 and 2. The gap may in particular be 0.5 mm to 10 mm wide, with a value in the range from 1 mm to 2 mm having proven advantageous. The ratio of the electrical resistivities should preferably be $\rho_{el\ glass\ gap}/\rho_{el\ glass} \geq 10$.

The solution proposed here is preferably used for bottom electrodes. Given suitable dimensioning and clamping of the arrangement, it can also be used for side electrodes.

In particular the materials with a high zirconium silicate content, such as ZS 1300 are similar materials, are suitable for the electrode brick, since these materials have a sufficient resistance to corrosion in most glass melts. The materials with a high zirconium oxide content, such as for example ZBX 950, are suitable for the insulation device in contact with the glass, in which context the electrical conductivity with respect to the glass melt must be taken into account. If the glass attack is tolerable, it is also possible to use AZS materials, such as ZAC 1711. All materials which are suitable for the temperatures prevailing at the interface between materials 1 and 2 are conceivable for the second or subsequent layers of the insulation device.

In addition to the above-described apparatus for reducing the local introduction of heating power into at least one region—adjacent to the electrode—of the wall, in which the shielding device is arranged in a region adjacent to the electrode, in a further embodiment the invention provides for the shielding device to be arranged in a region—adjacent to the electrode—of the melt.

This further option of arranging the shielding device allows the invention to advantageously provide the option of then also influencing the local introduction of heating power in at least one region—adjacent to the electrode—of the wall if the construction of the shielding device comprising electrode brick and insulation device in accordance with the invention is not possible, in particular for structural reasons.

Arranging a shielding device according to the invention in a region—adjacent to the electrode—of the melt also allows existing units to be retrofitted with a shielding apparatus according to the invention, thereby achieving the associated advantages.

To reduce the high energy densities in the immediate vicinity of the electrode, the shielding device in accordance with the second embodiment of the invention comprises a shielding basket.

A shielding basket, as it is known, allows high energy densities in the immediate vicinity of the electrode to be reduced. In the interior of a shielding basket of this type, the high electric field gradient which occurs in the immediately adjacent region of the electrode and according to equation 1 leads to the high energy concentrations in this region, is reduced. Therefore, the introduction of heating power is reduced compared to an arrangement without a shielding basket.

To allow the shielding basket to be arranged in an advantageous way in a region—adjacent to the electrode—of the melt, the shielding basket has an opening through which the electrode can be passed, the perpendicular through this opening defining the axis of the shielding basket.

If the opening of the shielding basket is arranged in an upper boundary of the shielding basket, it is advantageously possible to surround a large region of the electrode by the shielding basket with a simple structure. In a preferred embodiment, the shielding basket is arranged coaxially with respect to the electrode. It is in this way possible for the greatly excessive values for the electric field gradient and therefore for the introduction of heating power and the temperature, which are otherwise present in the region adjacent to the electrode, to be uniformly reduced.

This advantage can in particular be exploited to a considerable extent if the shielding basket is rotationally symmetrically in form. The axis of symmetry in this case forms the axis of the shielding basket. In addition to a circular configuration, however, an oval configuration of the shielding basket in a plane perpendicular to its axis also offers the abovementioned advantages.

In general, the shielding basket may also have a plurality of sides, in particular with sharply defined transitions, although these transitions may also be rounded. In this context, the variant which can be produced most efficiently under given conditions of an optionally existing installation is to be preferred. The shielding basket may in particular be composed of a plurality of parts which are connected to one another, in particular by screw connection, welding or other joining processes.

An advantageously simple structural configuration of the shielding basket is produced if the upper boundary of the shielding basket is formed integrally. In this case, by way of example, a plate with an opening for the electrode can be used as the upper boundary of the shielding basket. Then, the melt, given a suitable configuration of the lateral boundaries of the shielding basket, can be more or less enclosed in the basket region.

If virtually unimpeded glass exchange is desired, the invention provides a shielding basket which has two rims, which can be connected by elements, at least one rim forming the upper boundary. This embodiment comprises, for example, a cage-like structure made up of two rings which are connected to one another by webs.

The radius of the rings may in this case differ. By way of example, one rim may be arranged at a greater distance from the opening through which the electrode passes through the wall of the unit. This rim may in particular have a smaller radius than the other rim, which then forms a lower boundary. The webs then constitute lateral boundaries of the basket, so as to form a conical shielding basket.

The rims and the elements connecting them may, however, also be dimensioned and arranged in any other desired way depending on the demands imposed on the spatial distribution of the introduction of electrical power which is to be achieved.

According to a preferred embodiment, the longitudinal axis of the elements forms an angle W with that surface, facing the melt, of the region—adjacent to the electrode—of the wall.

The angle W in particular has a value in the range from $0<W\leq90°$. An advantageous shielding action can be achieved in particular if the angle W has a value in the range from $30°\leq W\leq 60°$.

To avoid possibly structurally complex securing of the shielding basket in the refractory material, the invention advantageously provides for it to be possible for the shielding basket to be secured to the electrode. In this case, it is assumed that there is no need for the electrode to be pushed further in during a tank campaign and that the electrode and the basket can be suitably protected from oxidation for example during heat-up. If the shielding basket is secured to the electrode, the electrode is to be installed at the final setting depth.

If, in particular on account of the risk of the electrode stick breaking off during operation or on account of problems with oxidation prevention during the heat-up phase, the possibility of pushing the electrode body further in needs to be retained, the shielding basket can be arranged in the glass melt without direct contact with the electrode body.

The problem of an excessively high current density in the intermediate space can be avoided if the shielding basket is connected to the outer region in a suitable way through the refractory wall. In this case, the heating electrode and the basket are at the same electrical potential on the cold outer side.

Securing the shielding basket to the electrode body itself advantageously makes it possible to use the shielding basket even for what are known as top electrodes, which are immersed in the glass melt from above. In the latter case, this is done in order to deliberately set the release of power in the vicinity of the electrode stick.

Otherwise, the shielding basket according to the invention is preferably used for bottom electrodes. In order to advantageously allow use even with side electrodes, moreover, the invention provides the option of configuring the shielding basket such that it can be secured to the wall.

Furthermore, it is also conceivable for suitable apparatuses, such as wedges or balls, which allow the electrode to be pushed in further and also allow intimate contact between the electrode stick and basket, to be fitted to the "basket" itself. If these apparatuses are used, however, according to the invention the corrosion to the corresponding refractory metal caused by the glass melt is very low.

To enable particularly high current densities to be introduced for efficient heating of the melt without endangering the materials used, the invention provides for the shielding basket to comprise Mo and/or W and/or $SnO_2$ and/or at least one precious metal and/or at least one alloy of the abovementioned materials and/or high-temperature-resistant steels.

On account of the design of the basket, in particular its contour, its height or further parameters, a different release of power in the vicinity of the electrode can be set, which has a direct effect on the flow field of the overall arrangement.

With a view to achieving a sufficient mechanical strength of the shielding basket combined, at the same time, with a high efficiency with regard to ensuring a uniform spatial distribution of the introduction of heating power into the wall, it has proven particularly advantageous to use specific dimensions for the corresponding lengths.

The invention in particular provides for the ratio of the length of the electrode body $L_{EK}$ which is immersed in the melt to the height $H_K$ of the shielding basket to have a value in the range from $1 \leq L_{EK}/H_K \leq 20$. In a particularly preferred embodiment, the ratio of the length of the electrode body $L_{EK}$ which is immersed in the melt to the height $H_K$ of the shielding basket has a value in the range from $2 \leq L_{EK}/H_K \leq 5$.

The ratio of the outer radius $R_K$ of the shielding basket to the radius $R_{EL}$ of the electrode body advantageously has a value in the range from $2 \leq R_K/R_{EL} \leq 15$. According to a particularly preferred embodiment, the ratio of the outer radius $R_K$ of the shielding basket to the radius $R_{EL}$ of the electrode body has a value in the range from $3 \leq R_K/R_{EL} \leq 7$.

The ratio of the distance $D_{HK}$ between two electrodes to the outer radius $R_K$ of the shielding basket according to the invention advantageously has a value in the range from $3 \leq D_{HK}/R_K \leq 500$. According to a particularly preferred embodiment, the ratio of the distance $D_{HK}$ between two electrodes to the outer radius $R_K$ of the shielding basket has a value in the range from $20 \leq D_{HK}/R_K \leq 80$.

The width $l_K$ of the upper rim of the shielding basket according to the invention is in the range from $0 \leq l_K \leq R_K$. According to a particularly preferred embodiment, the width $l_K$ of the upper rim of the shielding basket is in the range from $0 \leq l_K \leq \frac{1}{3} \cdot R_K$.

The width a of the gap between electrode body and inner boundary of the opening in the shielding basket is in the range from $0 \leq a \leq 50$ mm. According to a particularly preferred embodiment, the width a of the gap between electrode body and inner boundary of the opening in the shielding basket is in the range from $0$ mm $\leq a \leq 30$ mm.

The material thickness $d_K$ of the components of the shielding basket is in the range from $5$ mm $\leq d_K \leq 50$ mm. The width $b_{Sp}$ of the gap between electrode body and inner boundary of the opening in the wall is in the range from $1$ mm $\leq b_{Sp} \leq 30$ mm.

According to a particularly preferred embodiment, the width $b_{Sp}$ of the gap between electrode body and inner boundary of the opening in the wall is in the range from $2$ mm $\leq b_{Sp} \leq 5$ mm.

The thickness $D_{FF}$ of the material of the wall which is in contact with the melt is in the range from $50$ mm $\leq D_{FF} \leq 500$ mm. According to a particularly preferred embodiment, the thickness $D_{FF}$ of the material of the wall which is in contact with the melt is $100$ mm $\leq D_{FF} \leq 300$ mm.

To ensure reliable operation of the melting and/or refining unit according to the invention using at least one shielding basket, the invention advantageously provides that the ratio of the electrical resistivity $\rho_{el,refractory}$ of the at least one refractory material of the wall and/or of the at least one refractory material of the electrode brick and/or of the at least one refractory material of the insulation device to the electrical resistivity $\rho_{el,melt}$ of the melt has a value of from 1 to 20.

According to a particularly preferred embodiment, the ratio of the electrical resistivity $\rho_{el,refractory}$ of the at least one refractory material of the wall and/or of the at least one refractory material of the electrode brick and/or of the at least one refractory material of the insulation device to the electrical resistivity $\rho_{el,melt}$ of the melt has a value of from 1.5 to 5.

The use of a shielding basket allows the shielding device according to the invention to be of less sensitive construction compared to the insulation device. Therefore, smaller lower limit values and therefore a wider range for the parameter $\rho_{el,refractory}/\rho_{el,melt}$ are possible for the embodiment with a shielding basket. This means that a wider choice of materials is advantageously available for the refractory materials that can be used for a given melt.

The invention also encompasses the possibility of realizing a combination of electrode brick and insulation device with a shielding basket in an advantageous way, in order thereby to increase the number of possible parameters so as to set an optimum spatial distribution of the introduction of electrical heating power.

For efficient operation of the melting and/or refining unit, according to the invention the temperature T advantageously has a value in the range from $500°$ C. $\leq T \leq 3000°$ C. In a particularly preferred embodiment, the temperature T has a value in the range from $800°$ C. $\leq T \leq 1900°$ C. The temperature information relates to the components which are heated, i.e. in particular to the melt, the tank, the electrode and the shielding device.

According to the invention, the current loading i has a value of from $0.05$ A/cm$^2 \leq i \leq 20$ A/cm$^2$. The current loading information relates to metal parts, i.e. in particular to the electrode and/or the shielding basket and/or the electrode/shielding basket intermediate space.

The invention advantageously allows particularly high current loadings i. In a particularly preferred embodiment, the current loading i has a value in the range from $0.1$ A/cm$^2 \leq i \leq 3$ A/cm$^2$.

To make the apparatus according to the invention for reducing the local introduction of heating power in at least one region—adjacent to the electrode—of the wall as versatile as possible in use, the invention advantageously provides for the at least one electrode to be a bottom electrode and/or a side electrode and/or a top electrode.

Furthermore, the invention relates to the use of an apparatus for reducing the local introduction of heating power in at least one region—adjacent to the electrode—of the wall, the apparatus being designed in particular as described above, during operation of a unit for conductively heatable melts, in particular for glass melts.

BRIEF DESCRIPTION OF THE SEVERAL VIEWS OF THE DRAWINGS

The invention is explained in more detail below on the basis of exemplary embodiments and with reference to the accompanying drawings. In the drawings, identical components are denoted by the same reference designations. In the drawings.

DETAILED DESCRIPTION OF THE INVENTION

FIG. 1 illustrates a typical structure of an electrode for heating conductively heatable melts based on the example of a glass melt. The electrode 20 is fitted into an opening in a wall 10 of a melting and/or refining unit, in such a manner that electric current can be fed via the electrode 20 into a glass melt 30.

The electrode 20 comprises an in particular water-cooled electrode holder, in which the actual electrode body is secured in a suitable form. The electrode holder is externally connected to a heating circuit transformer via a cable. The electrode 20 comprising electrode holder and electrode body is introduced into the melt 30 through the wall 10, which is constructed from refractory materials, with the setting depth being determined by the particular type of glass. In this context, in particular the vitrification and crystallization properties, the required process temperatures and the thermal conductivity of the material of the wall 10 are important parameters.

Curve 1 in the diagram presented in FIG. 2 shows the power density curve around an electrode 20 in a wall 10 directly at that surface 18 of the wall 10 which faces the glass melt 30. The figure plots the power density in W/m$^3$ against the distance in m from the electrode 20. The figure illustrates the region around an electrode E1 for an arrangement in which a second electrode E2 is located in the direction of the positive distances, i.e. toward the right in the diagram. The plotted values are the result of a mathematical simulation of the area surrounding the electrode, in which $\rho_{el,refractory}=2.5 \cdot \rho_{el,glass}$; ($\rho_{el,glass}=20\ \Omega\cdot cm$) was predetermined as a boundary condition for the electrical resistivities.

The greatest power density is introduced into the surrounding material in the immediate vicinity of the electrode E1. Accordingly, the highest energy densities and therefore the highest temperatures will occur in these regions. The power density decreases considerably at increasing distance from the electrode. Even after just about 4 cm, it has dropped to approximately half its original value. This means that during conventional operation of the installation, extremely high gradients of the power density and therefore of the variables associated with the power density occur in the vicinity of the electrode. Particularly large amounts of energy are in this case released in the region of the main direction of flow, i.e. on that side of the electrode E1 which faces the adjacent electrode E2, on the right-hand side in the diagram.

The diagram presented in FIG. 3 illustrates the corresponding data on the power density curve around an electrode E1 at a depth of 5 cm, calculated from that surface 18 of the wall 10 which is in contact with the melt. As demonstrated by the data in curve 1, even at a depth of 5 cm within the wall 10, the highest power density values are reached in the immediate vicinity of the electrode.

The considerable drop in the power density at increasing distance from the electrode E1 at distances of less than about 5 cm, in addition to the higher resistivity of the electrode brick material compared to the glass melt, is also attributable to the cooling of the electrode, in particular the water cooling of the electrode holder and the possibility of forced convection of cooling air on the outer side of the electrode brick. As shown in curve 1, these cooling measures are insufficient for breaking down strong gradients in the power density in the vicinity of the electrode with a conventional arrangement.

To reduce the risk of damage to the refractory material of the wall 10, in particular caused by the formation of cracks and corrosion, according to the invention local differences in the spatial distribution of the introduction of power into the wall are reduced. According to a first embodiment of the invention, a shielding device which is arranged in a region—adjacent to the electrode 20—of the wall 10 is used for this purpose.

Figure 4:
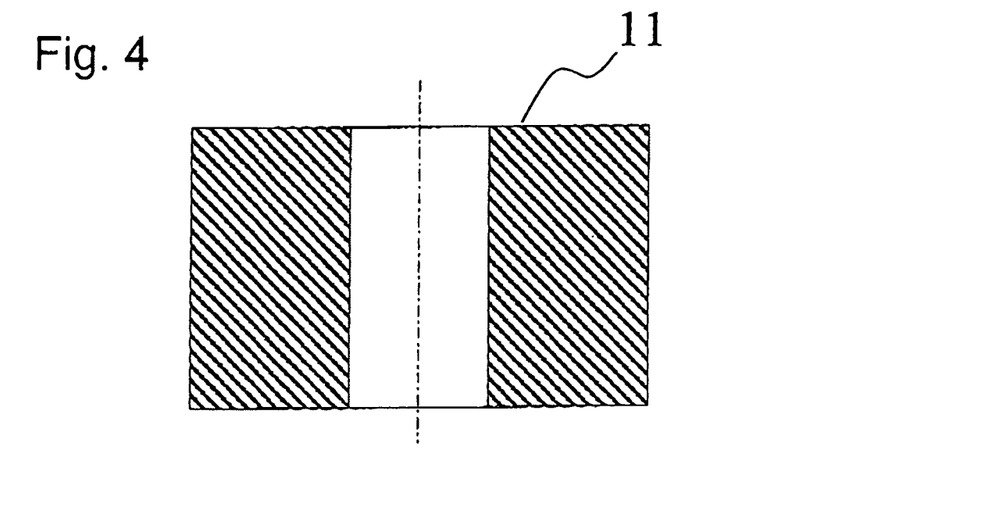
Figure 5:
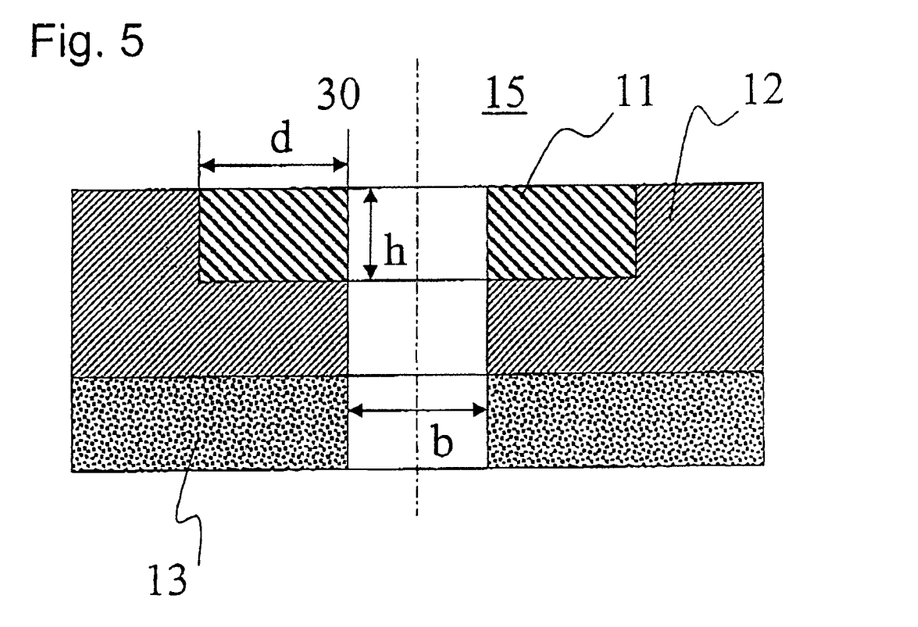

FIG. 4 shows a conventional structure of an electrode brick 11. Electrode bricks are customarily designed in the form of a monolithic block. By contrast, the invention, as illustrated in FIG. 5, provides for the shielding device 15, according to a first embodiment, to have an electrode brick 11 which is held by an insulation device.

In the example illustrated, the insulation device comprises a first layer 12, which also serves as a holder for the electrode brick 11, and a second layer 13, which forms a sandwich-like structure with the two layers of the electrode brick 11 and the first insulation layer 12.

The refractory materials 12 and 13 located around the actual electrode brick 11 serve as thermal insulation and thereby reduce the temperature gradient in the material of the actual electrode brick 11. Since the materials of the layers 12 and 13 additionally perform a supporting function, cracks which may under certain circumstances occur in the electrode brick 11, with the structure according to the invention, advantageously do not lead to the entire system failing.

A material which has a good ability to withstand temperature changes can be used for the refractory material 12. There is generally a selection of materials available which are additionally resistant to corrosion with respect to the glass melts 30 used. Moreover, the material 12 may have a significantly higher electrical conductivity, i.e. a reduced electrical resistivity, than the material of the actual electrode brick 11, since it is positioned further away from the electrode 20. The only restriction on the material of the layer 12 is formed by the electrical conductivity of the glass melt.

The inventors' practical experience has demonstrated that for reliable operation the condition $\rho_{el,refractory}=1.5 \cdot \rho_{el,glass}$ should be satisfied. The dimension d is selected in such a way that the electric field gradient $\Delta E_{1,2}$ in the region where the materials of the electrode brick 11 adjoin the first insulation layer 12 does not exceed a value of approximately 4 to 5

V/cm. The height of the electrode brick h is generally selected to be from 20 to 300 mm. The width of the gap b limits the lower value for the dimension d, the dimension d being at least double the gap width b.

In addition to the above-described advantages of the first embodiment of a shielding device 15 according to the invention, the sandwich-like structure illustrated in FIG. 5 offers the further positive effect that the materials of poor conductivity, such as in this case the materials of the electrode brick 11, are generally very expensive, and if their use is minimized in accordance with the invention, it is possible to save on high costs.

Figure 6A:
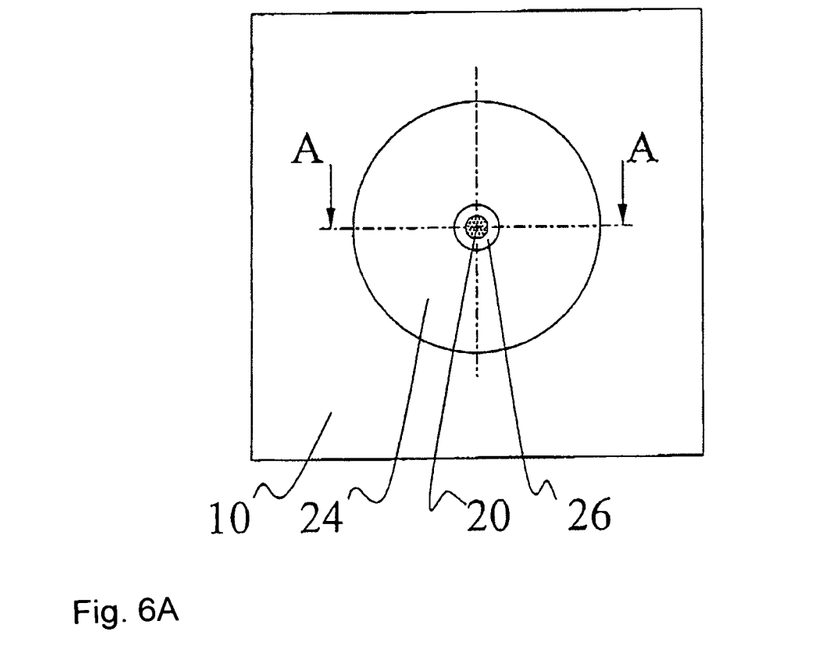
Figure 6B:
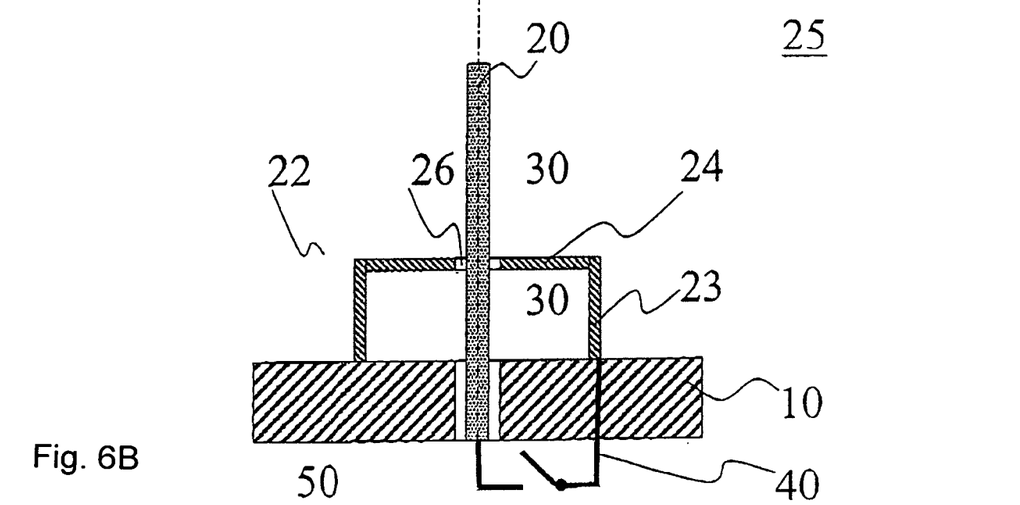
FIG. 6B is a longitudinal section through the shielding device of FIG. 6A taken through lines AA, FIG. 7A diagrammatically depicts a plan view of a further embodiment of a shielding device according to the invention.

FIG. 6 diagrammatically depicts a shielding device 25 in accordance with a second embodiment of the invention, which is arranged in a region—adjacent to the electrode 20—of the melt 30.

This shielding device 25 comprises a shielding basket 22, which has an opening 26 through which the electrode 20 can be passed. The opening 26 in the shielding basket 22 is arranged in an upper boundary 24 of the shielding basket.

In the example shown, the shielding basket 22 is cylindrical in form, with the boundary 24 delimiting the shielding basket 22 with respect to the melt 30 in the upward direction, while the lateral boundary 23 closes off the shielding basket 22 as seen in the radial direction from the electrode 20. In this embodiment, the melt 30 is substantially enclosed in the interior of the shielding basket 22.

Figure 7A:
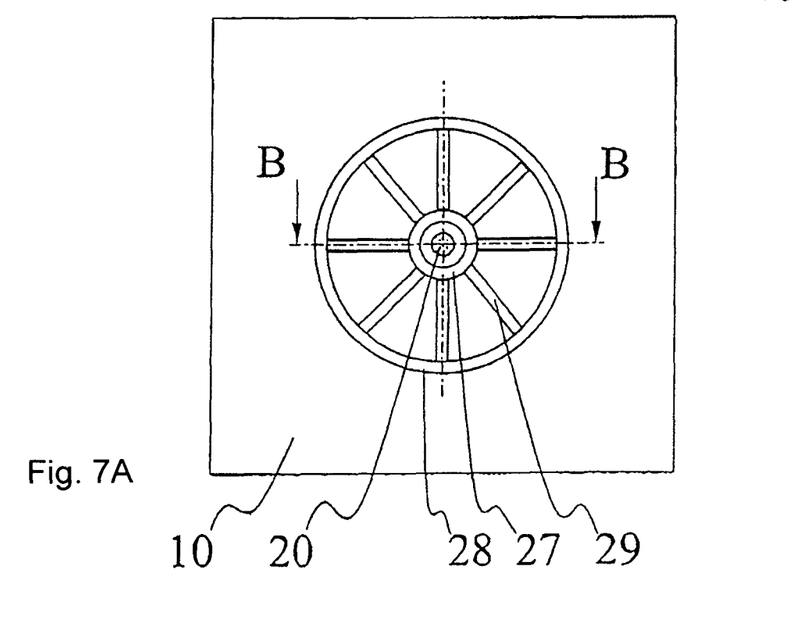
Figure 7B:
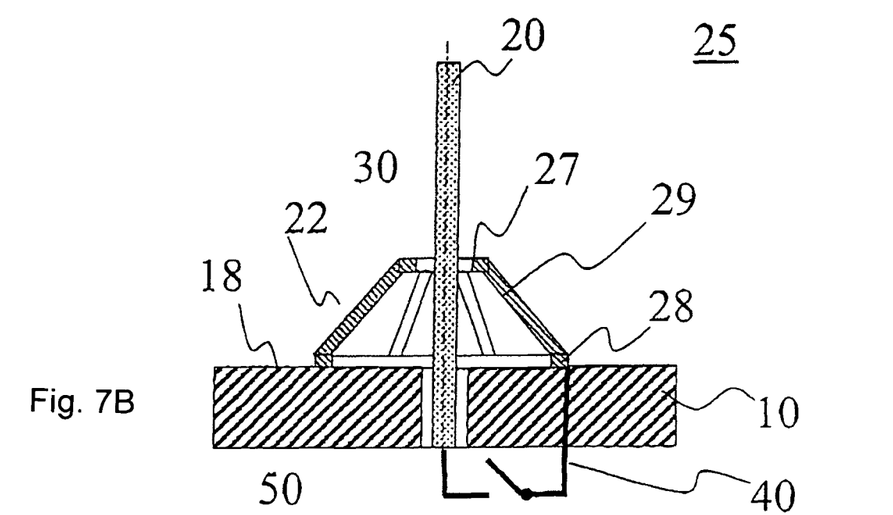
FIG. 7B is a longitudinal section through the shielding device of FIG. 7A taken through lines BB, FIG. 8 diagrammatically depicts the geometric dimensions of the shielding device according to the invention.

FIG. 7 illustrates a further embodiment of a shielding basket. A first rim 27 forms the upper boundary 24 of the shielding basket. A second rim 28 forms the lower boundary of the shielding basket 22. The two rims 27 and 28 are connected to one another by webs 29. In this variant, virtually unimpeded exchange of the melt 30 between the interior of the shielding basket 22 and the region outside the shielding basket 22 is possible.

The high gradient of the electric field which occurs in the immediate vicinity of the electrode 20 leads—as illustrated in curve 1 of the diagrams in FIGS. 2 and 3—to an uneven distribution of the power density and in particular to excess introduction of power in this region. This excess introduction of power can be reduced by the use of a shielding basket according to the invention. This is illustrated in curves 2, 3 and 4 in the abovementioned diagrams.

The simulations of the results illustrated by curves 2, 3 and 4 were carried out for a design of shielding basket 22 corresponding to the illustration shown in FIG. 6, with an external diameter of 250 mm. The distance from the inner boundary of the opening 26 in the shielding basket to the electrode was varied for the curves 2, 3 and 4.

If the inner boundary of the opening 26 of the shielding basket 22 is arranged at a distance of 28 mm from the electrode (curve 4), a considerable reduction in the local introduction of power density in the immediate vicinity of the electrode by about a third of the value without a shielding basket is already achieved. If the distance between the inner edge of the opening 26 of the shielding basket and the electrode is reduced further (curve 3, curve 2), the introduction of power density into the immediate vicinity of the electrode 20 decreases further.

The highest energy reduction compared to an electrode without a shielding basket in the immediate vicinity of the electrode 20 itself is achieved if the shielding basket 22 is secured directly to the electrode stick. This is illustrated by curve 2 in the diagrams presented in FIGS. 2 and 3.

The gradient of the electric field and therefore the power density are boosted at the outer edge of the shielding basket 22. The energy released in this region is greater than with the corresponding arrangement without basket 22. Nevertheless, even this increased introduction of power amounts to only a fraction of the values which are released in the immediate vicinity of the electrode without a basket. This slight increase in the power density in the region of the outer edge of the basket is therefore in no way critical. It does not present any danger to the refractory material of the wall 10. In particular, in this region there is a larger volume available for dissipating the heat which is generated. Therefore, any energy which may be fed into the refractory material can be quickly dissipated.

If the possibility of moving the electrode body further in needs to be preserved, the shielding basket 22 must not be in direct contact with the electrode 20. The possibility of moving the electrode body further in offers the advantage that it is possible to react flexibly to the risk of the electrode stick breaking off during operation or to problems with prevention of oxidation while the installation is being heated up. In this case, a certain distance has to be maintained between the electrode stick surface and the inner edge of the basket 22.

The problem of an excessively high current density in the intermediate space between shielding basket 22 and electrode 20 can be avoided if the shielding basket 22, as illustrated in the figures in the form of a possible electrical connection 40, is connected to the outer region 50 in a suitable way through the wall 10.

Figure 8:
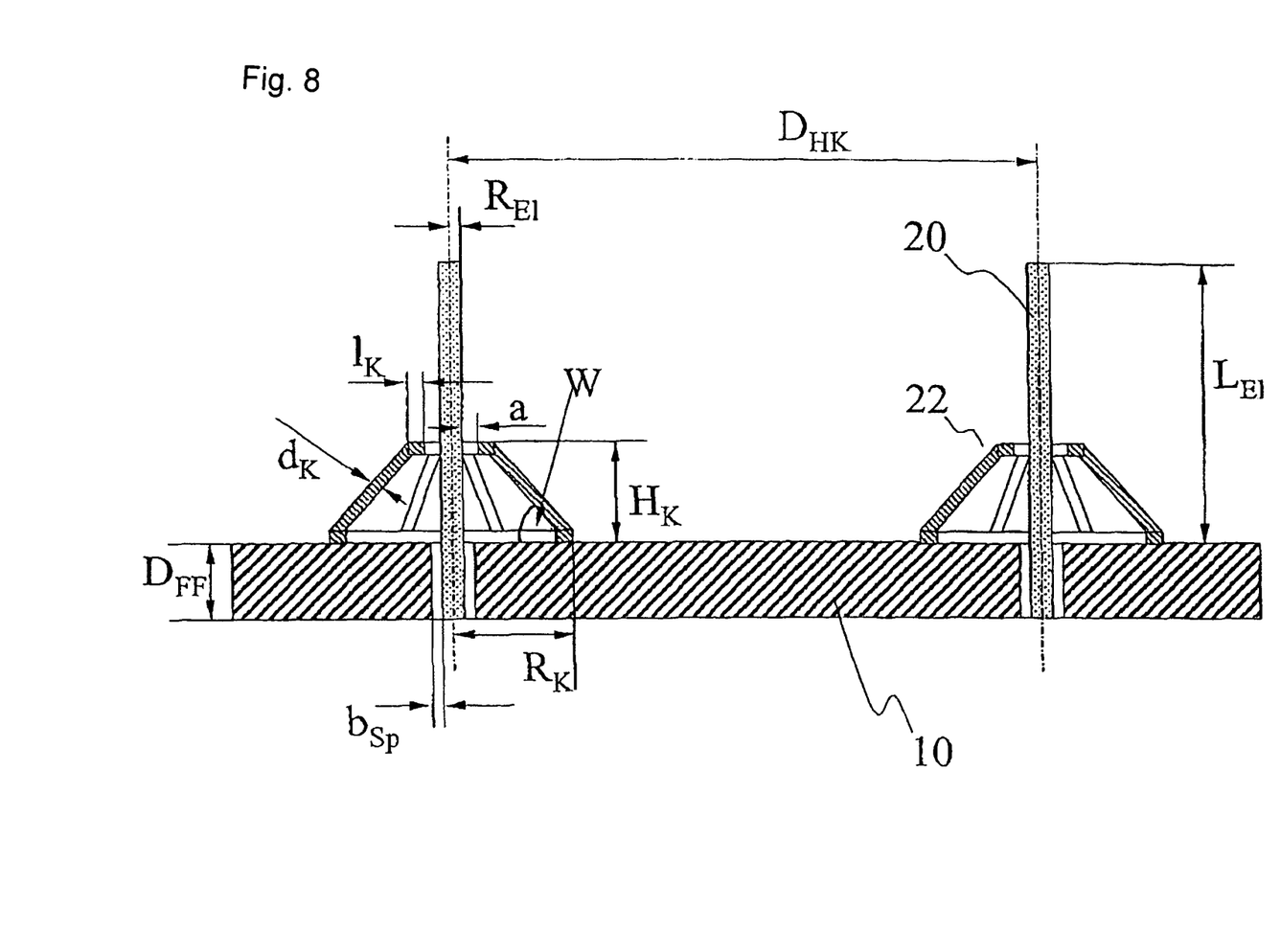

FIG. 8 illustrates relevant geometric variables of an arrangement according to the invention of the shielding device 25 for two adjacent electrodes 20. The abovementioned distance a between the electrode 20 and the inner edge of the basket 22 is indicated in this illustration. The smaller the distance a is selected to be, however, the higher the current densities in this transition region become.

The current flows on the path of least resistance from an electrode E1 of a heating circuit to the next electrode E2. Therefore, the maximum permissible current densities for the glass quality should be taken into account when selecting the distance a. In particular the formation of bubbles, the dissolution of glass and possible corrosion of the material of the electrode and/or of the shielding basket play a role in respect of the glass quality.

The two electrodes 20 are at a distance $D_{HK}$ from one another which indicates the length of the heating circuit. An electrode body has a radius $R_{el}$, and the length of the electrode body in the glass is $L_{el}$. The electrode 20 is arranged in an opening in the wall 10, with the width of the gap between electrode body and the inner boundary of the opening in the wall 10 being denoted by $b_{Sp}$. The thickness of the refractory material which is in contact with the glass melt is denoted by $D_{FF}$.

A shielding basket 22 is arranged around the electrode 20. The outer radius of the shielding basket is $R_K$, which is at the same time the greatest longitudinal axis in the heating direction. The height of the shielding basket is $H_K$. The width of the upper rim of the shielding basket 22, which is also referred to as the upper collar, is denoted by $l_K$. The material thickness of the components of the shielding basket 22 is $d_K$. In the embodiment shown, the longitudinal axis of the elements 29 includes an angle W with that surface 18, facing the melt, of the region—adjacent to the electrode 20—of the wall 10.

The invention claimed is:
1. A unit for a conductively heatable glass melt, comprising:
a tank having a wall with a wall opening therethrough, the wall having an inner surface that faces the conductively heatable glass melt;

at least one electrode passing through the wall opening so as to be immersed in the conductively heatable glass melt;

an apparatus for reducing the local introduction of heating power into at least one region of the wall, wherein the apparatus comprises at least one shielding device arranged in the conductively heatable glass melt adjacent to the at least one electrode, wherein the at least one shielding device is a shielding basket having a basket opening, an interior, an exterior, a lower boundary, and an upper boundary, wherein the at least one electrode passes through the basket opening, wherein at least a portion of the conductively heatable glass melt can be substantially enclosed in the interior of the shielding basket or can have a virtually unimpeded exchange between the interior and the exterior of the shielding basket, wherein the shielding basket is arranged so that the lower boundary faces the inner surface of the wall with the upper boundary immersed in the conductively heatable glass melt, and wherein the shielding basket reduces an electric field gradient that occurs in the conductively heatable glass melt immediately adjacent to the at least one electrode; and an electrical connection passing through the wall and electrically connecting the shielding basket to an outer region of the electrode.

2. The unit as claimed in claim 1, wherein the shielding basket has a basket opening through which the at least one electrode passes, wherein the shielding basket has an axis define through the basket opening.

3. The unit as claimed in claim 2, wherein the basket opening is arranged in the upper boundary of the shielding basket.

4. The unit as claimed in claim 2, wherein the at least one electrode is spaced from an inner boundary of the basket opening by a gap, the gap having a width in the range from greater than or equal to 0 to less than or equal to 50 mm.

5. The unit as claimed in claim 4, wherein the width is in the range from greater than or equal to 0 to less than or equal to 30 mm.

6. The unit as claimed in claim 1, wherein the shielding basket is arranged coaxially with respect to the at least one electrode.

7. The unit as claimed in claim 1, wherein the shielding basket is rotationally symmetrical in form.

8. The unit as claimed in claim 1, wherein the upper boundary is an integrally formed upper boundary.

9. The unit as claimed in claim 8, wherein the shielding basket has two rims connected by elements, wherein at least one of the two rims forms the upper boundary.

10. The unit as claimed in claim 9, wherein the elements have a longitudinal axis, wherein the longitudinal axis is angled with respect to the inner surface of the wall that faces the conductively heatable glass melt.

11. The unit as claimed in claim 10, wherein the angle has a value in the range from greater than 0° to less than or equal to 90°.

12. The unit as claimed in claim 11, wherein the angle has a value in the range from greater than or equal to 30° to less than or equal to 60°.

13. The unit as claimed in claim 9, wherein the elements have spaces therebetween to provide exchange of the conductively heatable glass melt between the interior of the shielding basket and a region outside the shielding basket.

14. The unit as claimed in claim 1, wherein the shielding basket is secured to the at least one electrode.

15. The unit as claimed in claim 1, wherein the shielding basket is secured to the wall.

16. The unit as claimed in claim 1, wherein the shielding basket comprises a material selected from the group consisting of Mo, W, $SnO_2$, at least one precious metal, an alloy of at least one of Mo, W, $SnO_2$, and a precious metal, a high-temperature-resistant steel, and any combinations thereof.

17. The unit as claimed in claim 1, wherein the at least one electrode has a length that is immersed in the conductively heatable glass melt and the shielding basket has a height such that ratio of the length to the height has a value in the range from greater than or equal to 1 to less than or equal to 20.

18. The unit as claimed in claim 17, wherein the ratio has a value in the range from greater than or equal to 2 to less than or equal to 5.

19. The unit as claimed in claim 1, wherein the shielding basket has a basket radius and the at least one electrode has an electrode radius such that a ratio of the basket radius to the electrode radius has a value in the range from greater than or equal to 2 to less than or equal to 15.

20. The unit as claimed in claim 19, wherein the ratio has a value in the range from greater than or equal to 3 to less than or equal to 7.

21. The unit as claimed in claim 1, wherein the at least one electrode comprises two electrodes spaced from one another by a distance and the shielding basket has a basket radius such that a ratio of the distance to the basket radius has a value in the range from greater than or equal to 3 to less than or equal to 500.

22. The unit as claimed in claim 21, wherein the ratio has a value in the range from greater than or equal to 20 to less than or equal to 80.

23. The unit as claimed in claim 21, wherein the shielding basket has an upper rim having a rim width that is greater than or equal to zero and less than or equal to the basket radius.

24. The unit as claimed in claim 23, wherein the rim width is less than or equal to one third of the basket radius.

25. The unit as claimed in claim 1, wherein the shielding basket has a material thickness in the range from greater than or equal to 5 mm to less than or equal to 50 mm.

26. The unit as claimed in claim 1, wherein the at least one electrode is spaced from an inner boundary of the wall opening by a gap, the gap having a width in the range from greater than or equal to 1 mm to less than or equal to 30 mm.

27. The unit as claimed in preceding claim 26, wherein the width is in the range from greater than or equal to 2 mm to less than or equal to 5 mm.

28. The unit as claimed in claim 1, wherein the wall has a thickness at least in an area where the wall is in contact with the conductively heatable glass melt in the range from greater than or equal to 50 mm to less than or equal to 500 mm.

29. The unit as claimed in claim 28, wherein the thickness is in the range from greater than or equal to 100 mm to less than or equal to 300 mm.

30. A method for reducing the local introduction of heating power into at least one region of a wall of a unit for a conductively heatable glass melt, comprising:

passing at least one electrode passing through an opening in the wall so as to be immersed in the conductively heatable glass melt;

arranging a shielding basket in the conductively heatable glass melt around the at least one electrode the at least one electrode passes through an opening in the shielding basket with a lower boundary of the shielding basket facing an inner surface of the wall and an upper boundary of the shielding basket immersed in the conductively heatable glass melt and so that at least a portion of the conductively heatable glass melt has a virtually unimpeded exchange between the interior and an exterior of the shielding basket; and passing an electrical connection through the wall and electrically connecting the shielding basket to an outer region of the electrode.

31. A unit for a conductively heatable glass melt, comprising:

a tank having a wall with a wall opening therethrough;

an electrode passing through the wall opening so as to be immersed in the conductively heatable glass melt within the tank;

a shielding basket immersed in the conductively heatable glass melt within the tank without passing through the wall, the shielding basket having a basket opening and an interior, the electrode passing through the interior and the basket opening, the basket opening having an inner boundary arranged at a predetermined distance from an outer boundary of the electrode, the shielding basket reducing an electric field gradient that occurs in the conductively heatable glass melt between the outer boundary of the at least one electrode and the inner boundary of the shielding basket; and an electrical connection passing through the wall and electrically connecting the shielding basket to an outer region of the electrode.

\* \* \* \* \*